United States Patent [19]
Gerdes et al.

[11] Patent Number: 5,535,629
[45] Date of Patent: Jul. 16, 1996

[54] DEVICE FOR MEASURING PRESSURE WITH REPLACEABLE CONNECTOR ELEMENT

[76] Inventors: Bernhard Gerdes, Im Schlattgarten 11, D-7852 Binzen; Winfried Maier, St.-Clara-Strasse 6, D-7864 Maulburg, both of Germany

[21] Appl. No.: 219,396

[22] Filed: Mar. 29, 1994

[51] Int. Cl.[6] .................................. G01L 7/00; G01L 7/08
[52] U.S. Cl. .................................. 73/756; 73/715; 73/723
[58] Field of Search .......................... 73/718, 719, 720, 73/721, 724, 725, 726, 727, 717, 723, 756, 715; 361/283.3, 283.4

[56] References Cited

U.S. PATENT DOCUMENTS

| | | | |
|---|---|---|---|
| 3,619,742 | 11/1971 | Rud . | |
| 4,329,732 | 5/1982 | Kavli et al. | 73/718 X |
| 4,414,851 | 11/1983 | Maglic | 73/724 |
| 4,425,799 | 1/1984 | Park | 73/718 |
| 4,442,474 | 4/1984 | de Jong et al. | 73/724 X |
| 4,507,973 | 4/1985 | Barr et al. . | |
| 4,617,607 | 10/1986 | Park et al. . | |
| 4,825,710 | 5/1989 | Koneval et al. . | |
| 5,060,108 | 10/1991 | Baker et al. | 73/718 X |
| 5,063,784 | 11/1991 | Ridenour . | |
| 5,159,525 | 10/1992 | Tate | 73/718 X |
| 5,313,839 | 5/1994 | Ridenour | 73/756 |

FOREIGN PATENT DOCUMENTS

| | | |
|---|---|---|
| 0310975 | 4/1989 | European Pat. Off. . |
| 410014 | 7/1989 | European Pat. Off. . |
| 0488446 | 11/1991 | European Pat. Off. . |
| 2124979 | 6/1984 | Germany . |
| WO90/04767 | 5/1990 | WIPO . |

OTHER PUBLICATIONS

Wagen Und Dosieren, vol. 21, No. 2, Feb. 1991, pp. 28–29, 'Modulares Drucksensorsystem'.
Und –Odor–Nor+ Steuerungstechnik, vol. 22, No. 12, Dec. 1989, p. 72, P. Mihm 'Anpassung Neuer Piezoresistiver Druckmessumformer An Verschiedene Prozessanschlusse'.

Primary Examiner—Richard Chilcot
Assistant Examiner—Joseph L. Felber
Attorney, Agent, or Firm—Barnes & Thornburg

[57] ABSTRACT

A transducer assembly for measuring pressure or differential pressure includes an oxide ceramic pressure measurement cell removably retained inside a connection housing by an annular set ring on a first side and by a cup packing located on a second side. The pressure measurement cell is held at a fixed distance inside a connection housing from a connector element. The connection housing removably connects to a main housing, allowing for release and replacement of any of the elements within the assembly, thus enabling adaptation of the device to different applications without recalibration.

15 Claims, 3 Drawing Sheets

DEVICE FOR MEASURING PRESSURE WITH REPLACEABLE CONNECTOR ELEMENT

BACKGROUND AND SUMMARY OF THE INVENTION

The invention pertains to a device for measuring pressure or differential pressure, with an oxide ceramic pressure measurement cell, surrounded by a connection housing, for converting the pressure or differential pressure impinging on the pressure measurement cell into an electrical quantity, with an interchangeable connector element penetrated by a centered hole for the physical connection of the measuring space containing measuring medium to the pressure measurement cell and/or the simultaneous attachment of the device at the measurement site.

Devices of this type have the objective of displaying the pressure or differential pressure impinging on the measuring medium, for instance in the inside of containers, conduits and the like, that is, in the measurement space, or of feeding it to a control room for display or to activate agents to intervene and control the course of the processes. For this purpose it is necessary to arrange these devices in such a way at the measurement site that they are mechanically fastened and that the pressure measurement cell to be acted upon by the pressure or differential pressure is in direct physical connection to the measuring space and thus the measuring medium.

If, in accordance with the state of the art commonly applied today, the pressure measurement cell is an oxide ceramic pressure measurement cell, then in order to achieve an exact measurement not influenced by temperature changes, it is necessary to minimize strain on the pressure-sensitive oxide ceramic pressure measurement cell inside the measuring device.

For the physical connection of the pressure measurement cell to the measuring medium, as well as the electrical connection of the sensor to a display unit, U.S. Pat. No. 4,825,710 proposes an electrical pressure sensor which has conical threaded holes in the housing bottom as well as in the electrical connector space lid, into which, depending on the necessary connection, interchangeable connector pieces or nipples are inserted. For the positive connection of housing and connector space lid, a loose clamping ring encloses a collar of the housing. The theory of this patent gives no indication of a minimized strain arrangement of an oxide ceramic transducer.

U.S. Pat. No. 4,617,607 discloses a capacitive high-pressure converter, in which an oxide ceramic pressure measurement cell is surrounded by a housing. A threaded ring is provided for fastening the pressure measurement cell, which is supported on an annular surface with an interposed spacer ring and which presses the transducer on its membrane side against a housing lid. The disadvantage of such an arrangement is that the pressure measurement cell is not supported in a minimized strain fashion and temperature-induced changes of the contact pressure have a deleterious effect on the measurement accuracy. Furthermore, the connector element is permanently connected by means of a welded bond to the housing surrounding the converter, so that removal and exchange of the connector element is not possible.

A capacitive pressure sensor is disclosed in German Patent No. 2,124,979 in which the pressure converter is surrounded by a housing corresponding to the general state of the art. The pressure converter here is connected to the pressure source by a flow channel penetrating a contact element. The contact element has means for fastening the sensor at the measuring site, for instance, in an internally threaded hole in the wall enclosing the measuring medium or in a mounting device, as well as means for introducing a torque. It is essential to the function of the pressure sensor that the flow channel forming the connection between pressure converter and pressure source be absolutely pressure-tight. In order to attain this, this publication proposes connecting the contact body to the housing by insertion, that is, nonremovably, by means of a press fit.

Another pressure pickup and a process for the calibration of pressure pickups can be derived from European Patent (OLS) 410,014. Therein it is proposed to form cross-shaped flexible diaphragms on the level of the measuring membrane by means of cylindrical recesses, which are equipped with elongation sensors. The pressure pickup additionally has a coaxially formed cylindrical recess into which a pressure connection element is inserted. The pressure connection element here likewise represents a connector stem with which the pressure pickup can be attached at the measuring site. A pressure medium channel running through its center also represents here the connection between the measuring medium and the measuring membrane. The pressure connector element also has means for holding the pressure pickup in place as well as means for introducing a torque. To provide absolute pressure-tightness between membrane and connector element it is proposed that both parts be connected nonremovably by a welded joint or some other appropriate joining technique.

Both of the latter proposed devices share the disadvantage in light of the known state of the art that the contact and/or connection means are not variable. Depending on the measuring objective it is necessary to satisfy different requirements for the attachment of the pressure or differential pressure pickup at the measurement site and/or connection with the measuring medium while simultaneously maintaining a minimized uniform strain arrangement of the pressure measurement cell in the interior of the housing. Thus, it is necessary to provide different diameters of connector thread or the flange depending on the pressures to be accommodated and the wall surrounding the measuring medium or the special mounting device. But for aggressive, corrosive and/or explosive media, the design of the attachment and/or connection elements permits only certain suitable materials, which, depending on the aggressiveness, corrosion, explosiveness, temperature and so on, are the only ones which may be allowed to come into contact with the measuring medium. In addition, different regulations and standards must be observed, which likewise lead to different attachment and/or connector elements for different countries. Finally, depending on the application it is necessary to provide the attachment and/or connection elements as threaded stems or as attachment flanges.

In light of the above, the invention sets the objective for itself of specifying a device for measuring pressure or differential pressure that guarantees the necessary minimized uniform strain seating of the oxide ceramic pressure measurement cell, as well as the absolute necessary pressure-tightness of the measuring unit, and additionally forms a releasable connection between measurement pickup and attachment .and connector elements, which removes previous disadvantages and represents a considerable reduction of costs, and the measuring device enclosed by an intermediate housing can remain unchanged independently of the various demands.

An additional advantage of the invention consists in the fact that the membrane of oxide ceramic measurement transducer, is easily accessible, for cleaning purposes, for instance, and that hence the sealing elements can be easily exchanged.

This objective is attained by the characteristic features of claim 1.

Additional advantageous configurations of the invention are characterized in the subclaims.

BRIEF DESCRIPTION OF THE DRAWING

Additional advantages of the invention are seen from the description below and the embodiment examples which are shown in the figures.

These show.

DESCRIPTION OF THE DRAWINGS

Figure 1:
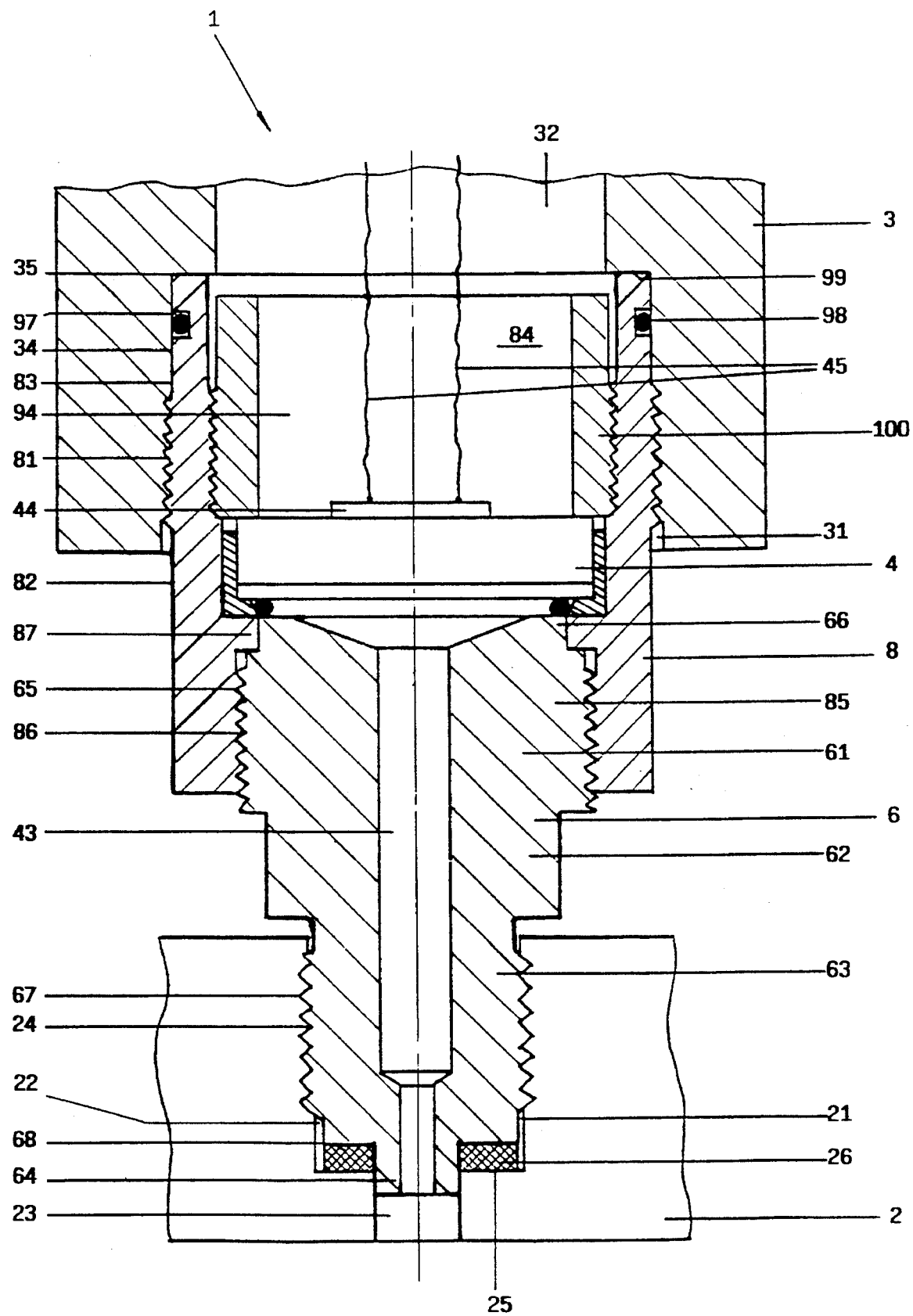
FIG. 1 a longitudinal section through a first embodiment example of a device with the invention, FIG. 2 a second embodiment example of this device, and FIG. 3 an enlarged section of a detail of the device shown in FIGS. 1 and 2.

FIG. 1 shows a pressure measurement device 1, where for the simplicity's sake it may be assumed that the pressure measurement device 1 is directly attached at the measurement site to the wall 2 of a container or tube containing the measuring medium. It can, of course, also be attached at the measurement site by means of a special mounting device. The pressure measurement device 1 has the objective of determining the pressure of the measuring medium prevailing in the interior of a container or tube during a process, converting it into an electrical signal, displaying it and/or transmitting it to a remote control room for display or for causing agents to be activated to intervene for control purposes in a process.

To attain this objective the pressure measurement device 1 is equipped with a display unit enclosed by the housing 3 and with the pressure measurement cell 4. In accordance with the common state of the art today, the pressure measurement cell 4 is a cylindrical capacitive pressure measuring element produced from an oxide ceramic, for instance $Al_2O_3$, glass or a monocrystalline material. The pressure measurement cell 4 shown in FIGS. 1–3 has a gap-shaped cylindrical cavity surrounded by the main element 41 and the membrane 42, on the cylindrical inner surface of which are arranged facing electrode structures separated by a defined gap and forming the measurement capacitor. The pressure measurement cell 4, however, can be any other type of oxide ceramic pressure measuring element. The pressure measurement cell 4 is arranged in such a way that the membrane 42 faces the measuring medium enclosed by the wall 2. In order for the pressure prevailing in the measuring medium to be applied, the elastic membrane 42 is in physical contact with measuring chamber, the interior of a container or a tube, for instance, via a pressure medium channel 43. The pressure measurement cell 4 converts the pressure applied onto it into an electrical signal.

On the side away from the measuring medium, the pressure measurement cell 4 possesses an electronic circuit 44, partially implanted into its surface. The electronic circuit 44 converts the capacitance value of the measuring capacitor into a proportional electrical magnitude which is fed via electrical connecting lines 45 to the display. In reality, the housing 3 extends axially somewhat beyond the figure and contains a display device arranged on the top side. Instead of to the direct display, or in addition to it, the electronic circuit 44 can be connected via the connection lines 45 to a display situated far from the measurement site, which displays the measured value at that locale. It may also have a direct or indirect influence on agents which then in turn intervene for purposes of control in the course of processes.

The pressure measurement device 1 has connector element 6 for attachment and/or connection to the measuring medium. In contrast to the state of the art as known so far, the connector element 6 here represents a multicomponent assembly which contains the pressure measurement cell 4 in a minimized, uniform strain fashion and maintains the connector element 6 at a precisely defined spacing from the membrane 42 of the pressure measurement cell 4, and the individual components of which can be assembled in accordance with the measurement objective of the pressure measurement device 1. The connector element 6 is formed in one piece from the collar 61, the hexagon 62, a threaded stem 63 and the guide slot 64. This may be done with a metal cutting or any other appropriate manufacturing process.

In order to connect the connector element 6 to the connection housing 8, the outer surface of the collar 61 is provided with external threading 65. A short section of smaller diameter extends axially on the front end of the collar 61 and forms the seal 66. An annular sealing surface 69 is formed on the front end of the seal 66, and extend inward somewhat at a 90° angle to the periphery of seal 66. The function of the seal 66 will be discussed below. On the side of collar 61 axially opposite the seal 66, the connector element continues as hexagon 62. The hexagon 62 serves for the introduction of a torque, with the aid of which the connector stem 6 is mechanically attached to the connection housing 8 and the pressure measurement device 1 at the measurement site in the wall 2 or to some other attachment and/or connection device. The hexagon 62 is followed by the threaded stem 63, the outer surface of which is likewise provided with an external thread 67. With the aid of the external thread 67, the pressure measurement device 1 is attached, for instance, to the wall 2 enclosing the measurement space. On the opposite side from the hexagon 62, the guide shaft 64 is formed on the threaded stem 63. The varying diameters of the threaded stem 63 and the guide shaft 64 form a shoulder in the form of an annular surface 68 which likewise extends away from the outer surface of the guide shaft 64 at an angle of 90° to the axis of symmetry and forms a sealing surface.

A hole 21 penetrates the wall 2 for the attachment of the pressure measurement device 1. The hole 21 fulfills two objectives at the same time. For that purpose it is divided into two sections of differing lengths 22,23. A first section of greater diameter 22, facing towards the pressure measurement device 1, is provided with internal threading 24 and serves to accept the threaded stem 63. Here the external threading 65 of the threaded stem 63 is screwed into the internal threading 24 of hole 21. The shorter section of smaller diameter 23, facing toward the measurement space, creates the physical connection between the measuring medium and the pressure measurement device 1. Due to the differing dimensions between the two sections 22,23, an annular shoulder 25 is formed, which faces the shoulder 68 of connector element 6. The attachment of the pressure measurement device 1 occurs under the influence of a sealing ring 26, with the shoulder 68 being supported on the shoulder 25. On the side facing the pressure measurement cell 4 the pressure medium channel 13 broadens like a truncated cone. This guarantees that pressure is applied to the entire circular surface of the membrane 42.

Figure 3:
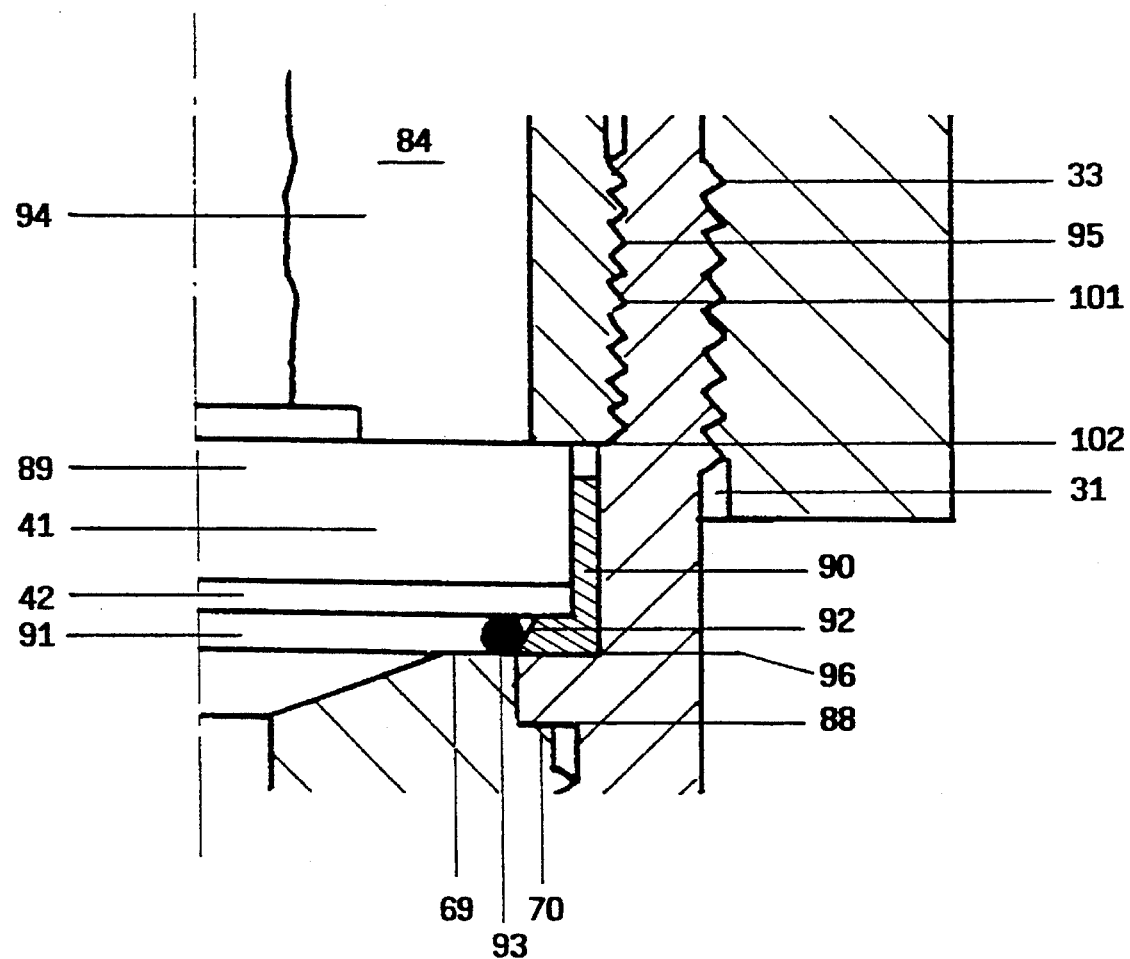

In order to attain the inventive objective, the connector element 6 is detachably connected to the housing 3, but not directly; rather, this occurs through the interposition of the connection housing 8. The connection housing 8 is shaped in the form of a threaded bushing. It can likewise be produced by a metal cutting or any other appropriate manufacturing process. The external surface of the connection housing 8 is provided with external threading 81. The external threading 81 does not, however, extend over the entire length of the external surface, but rather forms only a short section between two cylindrical sections 82 and 83. Furthermore, an opening 84 penetrates the connection housing 8. The opening 84 has three sections of varying length and varying diameter. On a first section 85, facing the connector element 6, an internal threading is formed. When the connector element 6 is inserted, the collar 61 penetrates into the opening section 85 and is screwed tightly there into internal threading 86 with external threading 65. This is only done, however, until the radially extending stop surface 69 on the sealing ridge 66 (FIG. 3) comes to rest on the end surface 88 of support ring 87 facing the connector element 6. The support ring 87 runs around the cylindrical wall of the opening 84 like a collar and extends somewhat radially. The support ring 87 thus forms an additional section of the opening 84, but with a smaller diameter. The support ring 87 is followed by an additional section 89 of the opening 84 (FIG. 3). It forms a hollow cylinder of somewhat larger diameter by comparison to the support ring 87. A pot-shaped cup packing 90 is arranged in the section 89 in such a way that its outer surface coincides with the inner surface of the opening 89. The cup packing 90 partially surrounds the pressure measurement cell 4 axially and on its bottom. The bottom of the cup packing 90 is penetrated by an opening 91, defined by an annular surface 92 which expands roughly at an angle of 30° relative to the axis of symmetry of the connection housing 8 in the direction turned away from the support ring 87. This is necessary because the generated surface 92 shaped like a spherical segment of two bases constitutes the defined support and mounting for a sealing ring 93, which alone guarantees the absolutely pressure-tight connection of the pressure measurement cell 4 to the measuring medium. This happens because the defined spacing between the sealing surface 69 and the stop surface 70 guarantees a defined contact pressure with which the seal 93, guided by the generated surface 92 shaped like a spherical segment of two bases, is supported between an annular surface encircling the membrane 42 of the pressure measurement cell 4 and the sealing surface 69. The sealing ring 93 can be formed by a commercially available O-ring and chosen to be made of a material which guarantees resistance to the measuring medium.

An additional section 94 of the opening 84 follows the section 89. This is likewise of hollow cylindrical form, and is provided in a part facing the section 89 with internal threading 95 (FIG. 3). A set ring 100 is screwed into the internal threading 95 of the connection housing 8 by means of external threading 101. The set ring 100 rests at its end surface 102 against an annular surface of the pressure measurement cell 4 as well as an annular surface encircling the membrane 91, and the annular bottom of the cup packing 90 rests against the end surface 96 of the support ring 87 facing the cup packing 90 in such a way that the minimized strain attachment of the pressure measurement cell 4 in the interior of the connection housing 8 is guaranteed. Since the pressure measurement cell 4 rests against the bottom of the cup packing 90, both the pressure measurement cell 4 and the cup packing 90 are fixed and maintained in position.

The housing 3 has a cylindrical connection opening 31 to accommodate the connection housing 8. It produces the physical connection to the interior 32 of housing 3. The connection opening 31 is of somewhat greater diameter than the interior 32, and is provided over up to roughly half of its axial length with internal threading 33. In the assembled state, the connection opening 31 is penetrated by sections 81 and 83 of the connection housing 8. Here the threaded sections 33 and 81 represent the releasable connection between the housing 3 and the connection housing 8. Following the threaded section 33, the connection opening 31 extends in the form of a smooth cylinder 34, the generated surface of which coincides with the periphery of section 83 of the connection housing 8. The section 83 is interrupted by the groove 97. The groove 97 has the function of accommodating an additional ring seal 98. The ring seal 98 rests against the inner surface of the cylindrical section 34 and seals off the interior 32 including the opening 84 against the environment. The ring seal 98 can also be a commercially available O-ring of a selected material. The connection opening 31 also has, on its end facing the interior 32, a shoulder 35. The shoulder 35 has the function of fixing the position of connection housing 8 in the inside of housing 3. For that purpose, the connection housing 8 rests against the shoulder 35 with its end surface 99.

The assembly of the connection housing 8 proceeds by first of all introducing the cup packing 90 into the opening section 89. After the subsequent placement of the pressure measurement cell 4, both parts 4 and 90 are fixed and maintained in position by the insertion of the set ring 100. Then follows the insertion of connector element 6 by screwing threading 65 into internal threading 86. After these assembly tasks have been performed, a complete, multiple usable pressure measurement device is available.

Now it is evident that the design of the connection between connection housing 8 and thus pressure measurement cell 4, on the one hand, and the connector element 6, on the other, as a positive and tight releasable connection permits a person skilled in the art to produce and apply the connector element 6 in any design corresponding to the intended use. This applies to the forms of connection required as well as the material from which the connector element must be produced in order to guarantee the required resistance to aggressive, corrosive or explosive measuring media. According to the necessity of the measuring task, it is only necessary that the connector element 6 and the ring seal 93 be changed and connected by means of the likewise variable connection housing 8 to the standardized housing 3. It goes without saying that depending on the measuring task, different connector elements can be produced in advance and kept economically available. An additional advantage of the design consists in the fact that, other than the ceramic membrane 42 of the pressure measurement cell 4, connector element 6 and the ring seal 93, no other part of the pressure measurement device comes into contact with the measuring medium. This means that all other parts, particularly the housing 3 of the pressure measurement device 1 can be made of economical materials.

Figure 2:
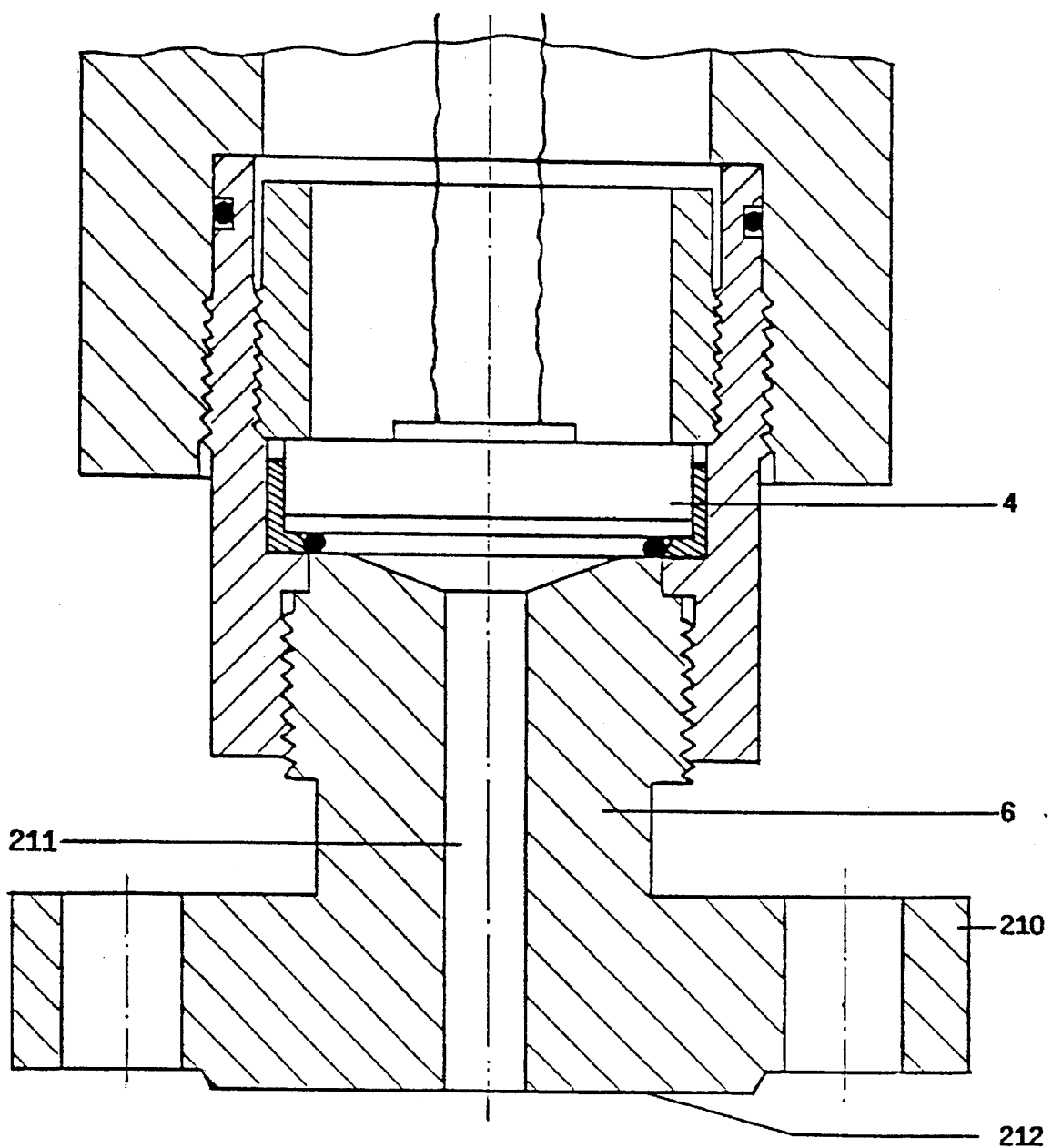

An additional embodiment of the invention is shown in FIG. 2. Here the otherwise identical connector element 6 is connected in one piece to the flange 210. Connector element 6 and flange 210 are penetrated by the cylindrical hole 211, which only represents an extended design of the pressure medium channel 43 from FIG. 1. Here too, the pressure measurement cell 4 is connected physically to the measuring medium by means of the cylindrical hole 211. The flange 210 serves both for the attachment of the pressure measurement device 1 at the measurement site as well as for sealing off the measurement space and the pressure medium channel through the interposition of a sealing ring, with the absolute sealing of the measurement chamber against the environment as well as that of the connection between pressure converter and pressure source being guaranteed by the sealing surface 212. In this embodiment, as well, the connector element 6 including the flange 210 can be produced by any manufacturing process known to a person skilled in the art.

With the embodiment illustrated in FIG. 2, the pressure measurement device can likewise be designed with a minimized strain arrangement of the pressure measurement cell 4 and a defined spacing of the connector element 6 from the membrane 42, corresponding to the requirements of the measuring task using different interchangeable flange forms, sizes and material.

The releasability of the connecting elements designed in this way brings the additional advantage that the release of the connection between connector element 6 and connection housing 8, as well as the exchanging of connector element 6, have no influence on the strain of the pressure measurement cell 4 and hence on the measuring accuracy of the device for measuring pressure or differential pressure.

We claim:

1. A device for measuring pressure, with an oxide ceramic pressure measurement cell for converting the pressure or differential pressure impinging upon the pressure measurement cell into an electrical quantity, and an interchangeable connector element penetrated by a centered opening defining a pressure medium channel for the physical connection of a measuring space enclosing a measuring medium to the pressure measurement cell and/or the simultaneous attachment of the device at a measurement site, characterized by the following features:

a) the oxide ceramic pressure measurement cell is retained within a connection housing by an annular set ring located on a first side of the pressure measurement cell and by a cup packing located on a second side of the pressure measurement cell which abuts an outer periphery of the pressure measurement cell;

b) the connection housing has means for holding the connector element inside the connection housing at a defined spacing from the pressure measurement cell; and c) the connection housing is connected, with a pressure-tight seal and releasably to both a main housing and the connector element, the connector element is exchangeable so that a replacement connector element assumes the same defined spacing from the pressure measurement cell inside the connection housing.

2. The device according to claim 1, wherein the means for holding the connector element at the defined spacing from the pressure measurement cell includes a support ring formed integrally with an interior wall of the connection housing for engaging a stop surface of the connector element.

3. The device according to claim 2, wherein in order to produce the defined spacing between the connector element and the pressure measurement cell, the connector element rests with its stop surface against an end surface of the support ring of the connection housing.

4. The device according to claim 1, wherein releasable connections between the connection housing, the connector element and the main housing are formed by screw connections.

5. The device according to claim 4, wherein the connection housing is partially penetrated by the connector element and the main housing is partially penetrated by the connection housing.

6. The device according to claim 1, wherein a releasable connection between the connector element and the connection housing has sealing means by which the pressure medium channel is sealed.

7. The device according to claim 1, wherein a preassembled pressure measurement device is formed from the pressure measurement cell, the connection housing, the cup packing, and the annular set ring.

8. The device according to claim 1, wherein the pressure measurement cell inside the connection housing is partially enclosed on its second side and end surfaces by the cup packing.

9. The device according to claim 8, the cup packing is penetrated on a side facing a membrane of the pressure measurement cell by a cylindrical opening.

10. The device according to claim 9, wherein an annular surface defines the cylindrical opening (91) in the cup packing, which annular surface holds and supports a ring seal in the cylindrical opening.

11. The device according to claims 1, wherein the pressure measurement cell and the cup packing are held in place inside the connection housing by means of the set ring which abuts the pressure measurement cell and the cup packing which abuts a support ring of the connection housing.

12. The device according to claim 1, wherein the connector element and the replacement connector element have different configurations.

13. The device according to claims 1 or 6, wherein the connector element has a sealing surface formed on an end face which rests against a membrane of the pressure measurement cell through an interposed ring seal.

14. The device according to claim 13, wherein the ring seal is interchangeable and resistant.

15. The device according to claim 1 wherein an end face of the connection housing abuts a shoulder of the main housing.

* * * * *